(No Model.)

W. L. FIFIELD.
DRILLING APPARATUS.

No. 555,442. Patented Feb. 25, 1896.

Witnesses.
C. H. Garnett
A. W. Hill

Inventor.
Walter L. Fifield,
by Ewing W. Hamlen
his Attorney.

UNITED STATES PATENT OFFICE.

WALTER L. FIFIELD, OF AUGUSTA, MAINE.

DRILLING APPARATUS.

SPECIFICATION forming part of Letters Patent No. 555,442, dated February 25, 1896.

Application filed September 16, 1895. Serial No. 562,663. (No model.)

*To all whom it may concern:*

Be it known that I, WALTER L. FIFIELD, a citizen of the United States, residing at Augusta, in the county of Kennebec and State of Maine, have invented a new and useful Improvement in Drilling Apparatus, of which the following is a specification.

My invention relates to improvements in drilling apparatus or boring-braces; and the object of it is to provide a brace for drilling metal or other material which will not require pressure by the operator.

My invention consists of a screw-threaded spindle adapted at one end to fit in the socket of an ordinary brace and at the other to hold an ordinary bit, a collar on said spindle, a bracket holding said collar, and a chain attached to said bracket and capable of being passed around the thing to be bored or drilled.

Figure 1:
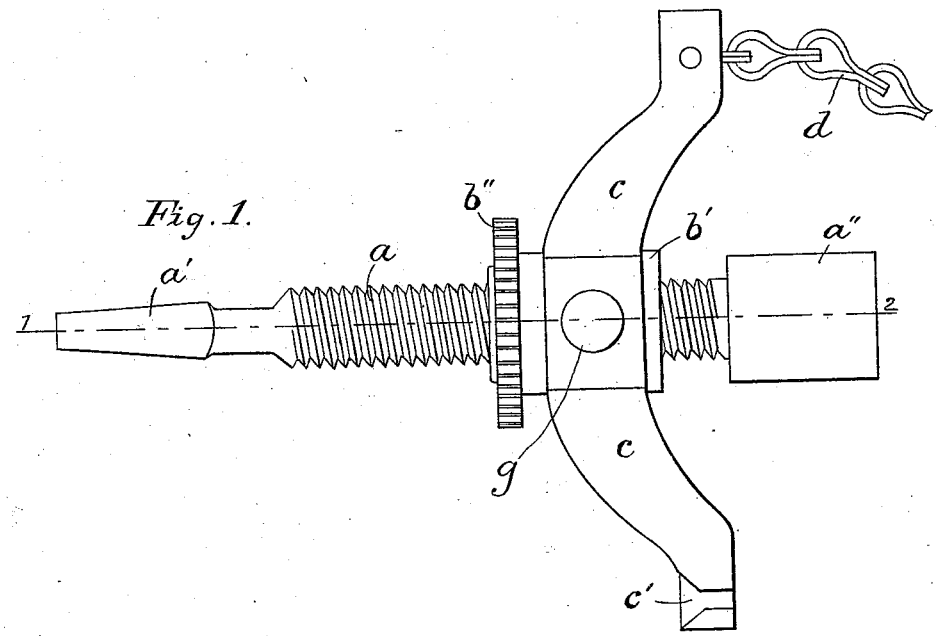
Figure 2:
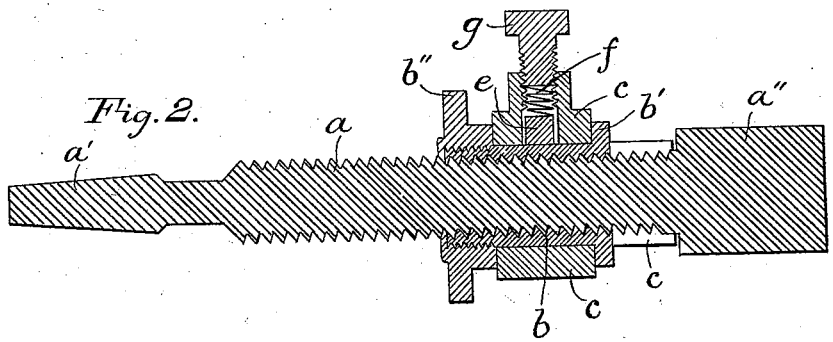

In the drawings, Figure 1 represents a front view of my improvement, and Fig. 2 represents a section on line 1 2 of Fig. 1.

The same letters of reference indicate the same parts in both drawings.

$a$ represents the spindle, one end of which, $a'$, is adapted to fit in the bit-socket of an ordinary boring-brace, and the other end of which, $a''$, is provided with a socket for a bit of any desired shape. In the sectional view, Fig. 2, this end $a''$ is shown as solid; but it will be understood that it is to be socketed to receive a bit, the shape of the socket being immaterial to the present invention.

$b$ represents a collar, the interior of which is threaded and engages the thread of the spindle $a$. The exterior surface of the collar $b$ is smooth, and the collar is adapted to revolve freely in the supporting-bracket $c$. The collar $b$ is provided at one end with a head $b'$ and at the other with another head or rim $b''$, which latter preferably has a milled edge. In Fig. 2 I have shown the head $b''$ as screwed onto the collar $b$, but it may be firmly affixed thereto in any other suitable manner.

To one end of the bracket $c$ is affixed a chain $d$, which is adapted to be passed around the thing to be drilled and attached to the other end of the bracket $c$ by means of the slot $c'$ or other suitable fastening.

The front part of the bracket $c$ has a hole drilled clear through it, and in said hole is, first, a piece of brass $e$ adapted to bear frictionally on the outer surface of the collar $b$; second, a spiral spring $f$, and, third, an adjusting-screw $g$, the outer end of said hole being threaded to receive the screw $g$.

When it is desired to use my improvement, the head $a'$ is inserted in the bit-socket of an ordinary boring-brace and a bit is inserted in the socket in the head $a''$. The chain $d$ is then passed around the thing to be drilled and its loose end secured to the bracket at $c'$. The point of the bit in the head $a''$ is then brought to a proper bearing upon the thing to be drilled by turning the collar $b$ by means of the milled head $b''$.

It will readily be seen that if the collar $b$ were fast in or solid with the bracket $c$ the rate of feed of the bit would be just the pitch of the screw on the spindle $a$; but this is avoided by making the collar capable of turning free in the bracket and by the frictional holding of said collar in the bracket. The required degree of frictional hold is given to the collar by means of the adjusting-screw $g$, which, through the spiral spring $f$, presses the brass piece $e$ against the collar. The boring-brace is then rotated in the ordinary way; but it will readily be seen that pressure on said brace is not necessary, the screw-thread of the spindle and the holding pressure of the chain $d$ supplying all that is necessary.

From the above it will be understood that when the pitch of the screw-thread on the spindle $a$ becomes too high a rate of feed for the boring-bit the collar $b$ will turn slightly in its socket in the bracket $c$, and thus reduce the rate of feed.

Although I have described my invention as being used with an ordinary brace, it will be clear that it can be used equally well with any other device which will rotate it as required.

I claim—

The combination of a screw-threaded spindle adapted at one end to fit the socket of an ordinary boring-brace and at the other to hold a bit, a collar on said spindle engaging the screw-thread thereof, a bracket supporting said collar, the plate *e*, spring *f*, and screw *g* in said bracket, by means of which adjustable pressure is applied and automatically continued on the side of said collar, to check the rotation of the same in the bracket and give an even feed to the drill, and means whereby said bracket may be attached to the thing to be drilled, substantially as described.

In testimony whereof I have hereunto set my hand this 12th day of September, A. D. 1895.

WALTER L. FIFIELD.

Witnesses:
EWING W. HAMLEN,
H. W. TRUE.